June 14, 1949.  G. S. ZELK  2,473,187
AUTOMOBILE DISAPPEARING WARNING SIGNAL
Filed Feb. 17, 1947  2 Sheets-Sheet 1

FLASHING MECHANISM

INVENTOR.
GEORGE S. ZELK
BY Alexander Riaboff
ATTORNEY

June 14, 1949.   G. S. ZELK   2,473,187
AUTOMOBILE DISAPPEARING WARNING SIGNAL
Filed Feb. 17, 1947   2 Sheets-Sheet 2

INVENTOR.
GEORGE S. ZELK
BY Alexander Riaboff
ATTORNEY

Patented June 14, 1949

2,473,187

UNITED STATES PATENT OFFICE 2,473,187

AUTOMOBILE DISAPPEARING WARNING SIGNAL

George S. Zelk, Vallejo, Calif.

Application February 17, 1947, Serial No. 729,036

4 Claims. (Cl. 177—329)

This invention relates to a disappearing warning signal.

The object of this invention is to provide a disappearing warning signal for a police automobile or other vehicles which signal is adapted to appear against the rear window whenever it is desirable or necessary, and flash red light therethrough, but which signal does not obstruct said rear window during the normal operation of the automobile.

Another object of this invention is to provide a signal of the type described which is installed inside of an automobile near the rear window thereof and has the lamps normally in downward position, and which is adapted to swing said lamps upwardly so that the latter take the position opposite said window and thereupon begin to flash an intermittent red light through said window.

Still another object of this invention is to provide a signal of the type described in which the beams of light emitted by the lamps are so directed as to be visible by the vehicles approaching the signal from the rear at any angle.

Another object of this invention is to provide a device of the type described which is simple in construction, easy to operate, durable and efficient for the purpose intended.

Other objects and advantages will appear as the specification proceeds and the particular features of the invention will be specifically pointed out in the appended claims.

The invention is illustrated in the accompanying drawing in which

In detail, my device consists of an operating mechanism 1 and two lamps 2 and 3 carried by a shaft 4 passing through said mechanism.

Figure 1:
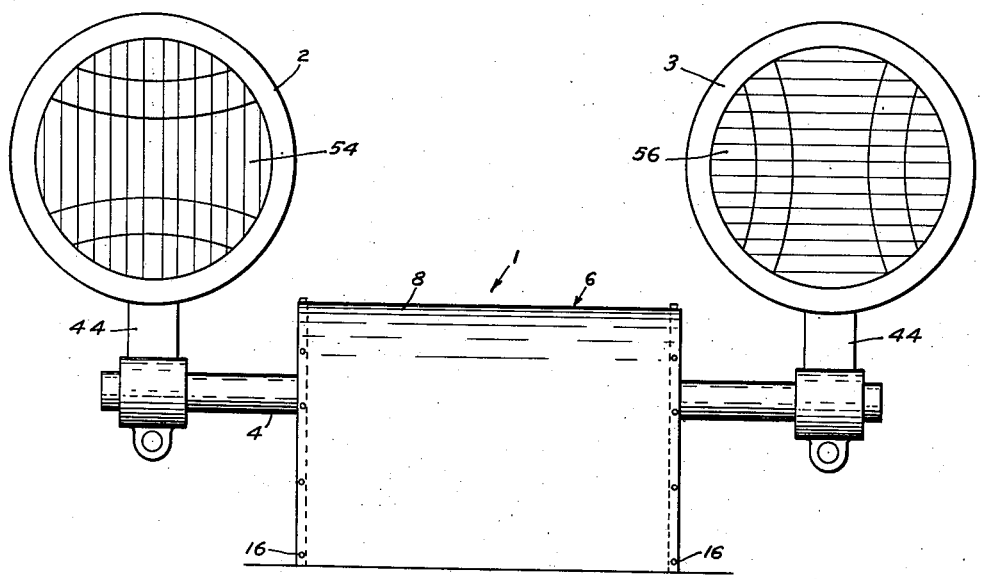
Fig. 1 is a front view of the device in operating position.
Figure 2:
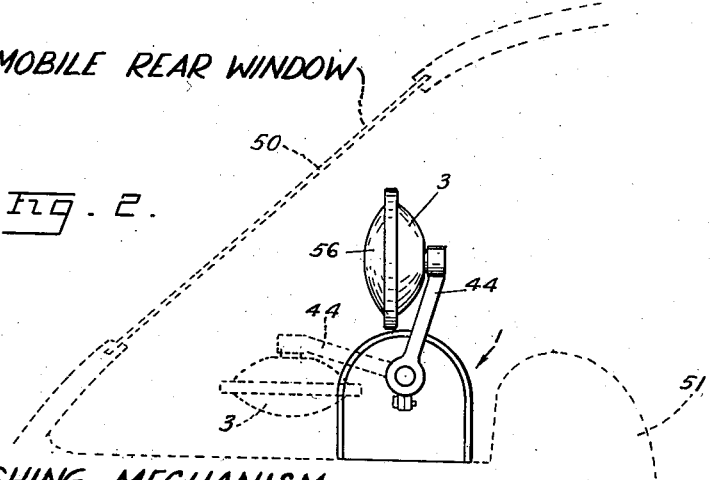
Fig. 2 is a side view of the device in operating position showing the location thereof in an automobile.
Figure 3:
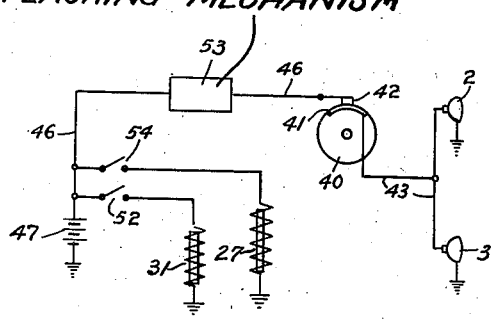
Fig. 3 is an electric wiring diagram showing the operation of the device.
Figure 5:
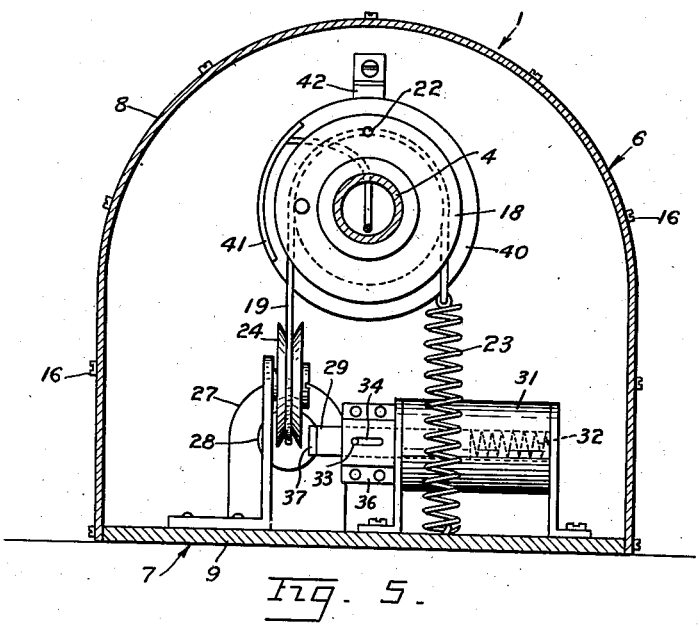
Fig. 5 is a vertical cross-section of the device taken along the line 5—5 of the Fig. 4.

The mechanism 1 is enclosed in a container 6 consisting of a casing 7 and a cover 8. The casing 7 includes a flat rectangular bottom 9 and end walls 11 and 12 integral with said bottom and rising therefrom at a right angle thereto. The upper ends of said walls are rounded as shown in Figs. 2 and 5. The casing 7 is closed by the cover 8 preferably made out of sheet metal. The cover 8 extends from one side of the bottom 9 to the other and follows the configuration of the end walls 11 and 12, to which said cover is attached by set screws 16.

The operating mechanism 1 enclosed in said container 6 includes the shaft 4 journalled in the bearings 17 carried by the end walls 11 and 12. The shaft 4 carries a pulley 18 affixed thereto near the end wall 12. The pulley 18 has a cable 19 resting in the groove 21 therein and attached to said pulley by a bolt or screw 22. One end of said cable is attached to a spring 23 which in turn is attached to the bottom 9. The other end of said cable passes over an idle pulley 24 and is attached to a core 26 of an operating electromagnet 27. The core 26 is provided with a collar 28 at the end thereof, the outer edge of which collar is bevelled toward the electromagnet 27.

Figure 4:
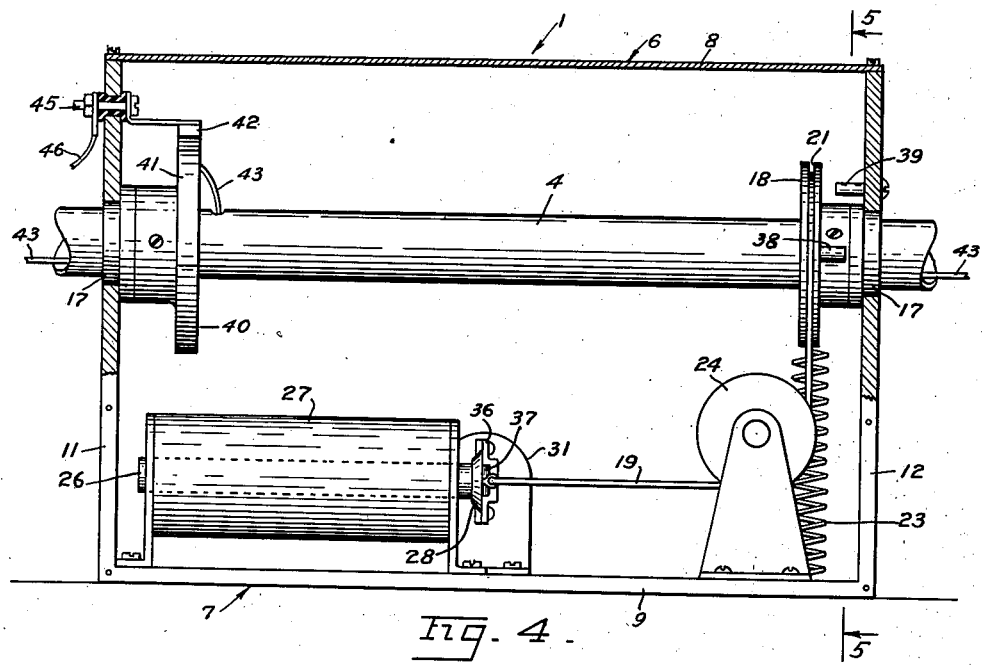
Fig. 4 is a vertical longitudinal cross-section of the device showing some part in section.

The core 26 is held in contracted position by a core 29 of a releasing electromagnet 31. The core 29 is yieldingly pressed by a spring 32 to the left looking at the Fig. 5. This movement is limited by a pin 33 carried by said core 29 and sliding in a slot 34 of a guide bracket 36 attached to said electromagnet 31. The core 29 has an outwardly bevelled end 37 which projects certain distance away from said bracket 36 and into the path of travel of the collar 28, thereby holding the core 26 in the retracted position as shown in Fig. 4. When the core 29 is withdrawn inwardly by the action of the releasing electromagnet 31, the spring 23 pulls the end of the cable 19 downwardly and rotates the pulley 90° in a clockwise direction looking at the Fig. 5. This rotation is stopped by a pin 38 attached to the pulley 18, when said pin hits a stop 39 secured to the end wall 12. When the shaft 4 is in the latter position, the lamps 2 and 3 take upward position shown in Fig. 2 in full lines.

When the operating electromagnet 27 is energized, the core 26 is pulled inwardly, whereby the bevelled side of the collar 28 strikes the bevelled end of the core 29, thus forcing the latter to spring back and to pass said collar beyond said core 29. The inward movement of the core 26 pulls the cable 19 and by means of the pulley 18 rotates the shaft 4 in a counterclockwise direction to a position shown in Fig. 5 whereby the lamps 2 and 3 take the downward position shown in Fig. 2 in dotted lines.

The shaft 4 also carries attached thereto a wheel 40 preferably made of insulating material. The wheel 40 is provided with a metal strip 41 imbedded in the periphery thereof. A sliding contact 42 is attached to the end wall 11 and is arranged to slide over the periphery of said wheel 40. When the shaft 4 is in the position shown in the Fig. 5, the sliding contact 42 rests on the wheel 40 outside said strip 41. When the shaft 4 is rotated 90° as above described, the sliding contact 42 rests on the strip 41. The latter is connected to an electric cable 43 carried inside of the shaft 4 the ends of which cable are connected to the lamps 2 and 3 fixedly attached to the shaft 4 by means of supports 44. The sliding contact 42 is connected to an insulated post 45 which in turn is connected by means of a cable 46 to a source of electric power, such as a battery 47.

The device is attached inside of an automobile near the rear window 50, between the latter and the rear seat 51. Normally the lamps 2 and 3 are in downward position as shown in Fig. 2 in dotted lines, and for that reason do not obstruct the rear window leaving the driver clear unimpeded view rearwardly through a mirror usually attached inside of the automobile to, or near, the windshield.

The driver of the automobile desiring to raise the lamps and put the same in operation, presses a releasing switch 52 whereby the releasing electromagnet 31 is energized. The core 29 moves inwardly, thus permitting the core 26 to move outwardly. The spring 23 pulls the cable 19, rotates the shaft 4 until the pin 38 strikes the stop 39 and thereby brings the lamps in operating position as shown in Fig. 2 in solid lines. At this moment the sliding contact 42 rests on the strip 41 thus sending electric current from the battery 47 to some standard flashing mechanism 53 and therefrom to the sliding contact 42, strip 41, cable 43 and the lamps 2 and 3. The latter immediately start to flash, preferably red light. The lenses 54 and 56 are arranged to disperse the light along the vertical and horizontal planes so as to be visible to all vehicles which may approach said automobile from the rear under any condition.

When the signal is not needed any more, the driver presses an actuating switch 54, thereby energizing the operating electromagnet 27. The latter pulls the core 26 in, and with it the cable 19. The latter rotates the pulley 18 and the shaft 4 in counter clockwise direction 90° against the tension of the spring 23, thus bringing the lamps 2 and 3 in downward position.

When the collar 28 strikes the bevelled end of the core 29, it pushes the latter out of the way and passes beyond said end. The latter immediately snaps back into its normal position, thus blocking the way for the collar 28 and the core 26 for forward movement after the switch 54 is released and the action of the electromagnet 27 ceases, thus leaving said cable under the tension of the spring 23. The signal is again ready for operation.

Having thus described my invention, I claim:

1. A disappearing warning signal adapted to be installed inside of an automobile near the rear window thereof, comprising a pair of lamps and means for raising and lowering said lamps, said means including a shaft which carries the lamps, an electromagnet for operating said shaft, and means for holding the lamps in raised or lowered position.

2. A disappearing warning signal adapted to emit light through the rear window of a vehicle, comprising a plurality of lamps attached to a shaft, means for rotating said shaft so as to raise said lamps in front of said rear window or to lower the same so as to make invisible from outside of the vehicle.

3. A disappearing warning signal adapted to emit light through the rear window of a motor vehicle comprising a plurality of lamps, said lamps being adapted to rest normally in a position invisible from outside of said vehicle; said lamps being carried by a shaft; and means for rotating said shaft so as to raise said lamps in front of said rear window; means for bringing the same in their normal position, and means for sending intermittent light signals.

4. A disappearing warning signal adapted to emit light through the rear window of a motor vehicle comprising a plurality of lamps, said lamps being adapted to rest normally in a position invisible from outside of said vehicle; said lamps being carried by a common shaft; a spring operatively connected with said shaft for rotating the same to raise said lamps in front of said rear window; electromagnetic means for lowering said lamps to their normal position.

GEORGE S. ZELK.

REFERENCES CITED

The following references are of record in the file of this patent:

UNITED STATES PATENTS

| Number | Name | Date |
|---|---|---|
| 1,106,134 | Cowgill | Aug. 4, 1914 |
| 1,251,940 | Ulch | Jan. 1, 1912 |
| 1,370,674 | Smith | Mar. 8, 1926 |
| 1,832,675 | Weis | Nov. 17, 1931 |
| 2,190,124 | Rudolph | Feb. 13, 1940 |